L. MILLER.
Crank-Wheel.

No. 163,390.  Patented May 18, 1875.

Witnesses.
D. P. Cowl
Edmund Masson

Inventor.
Lewis Miller,
By atty. A. B. Stoughton.

THE GRAPHIC CO. PHOTO-LITH. 39 & 41 PARK PLACE, N.Y.

UNITED STATES PATENT OFFICE.

LEWIS MILLER, OF AKRON, OHIO.

IMPROVEMENT IN CRANK-WHEELS.

Specification forming part of Letters Patent No. 163,390, dated May 18, 1875; application filed March 29, 1875.

*To all whom it may concern:*

Be it known that I, LEWIS MILLER, of Akron, in the county of Summit and State of Ohio, have invented certain new and useful Improvements in Balance Cranks or Crank-Wheels; and that the following is a full, clear, and exact description of the same, reference being had to the accompanying drawing, making a part of this specification, in which—

Figure 1:
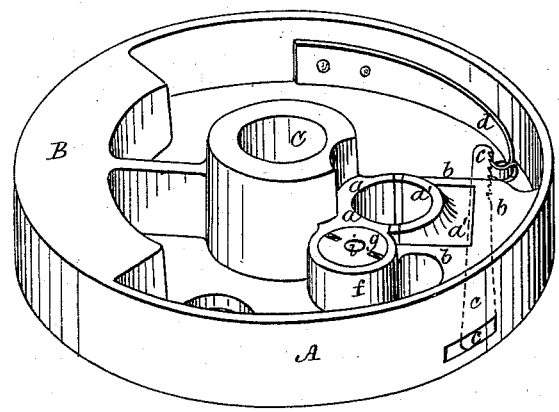
Figure 2:
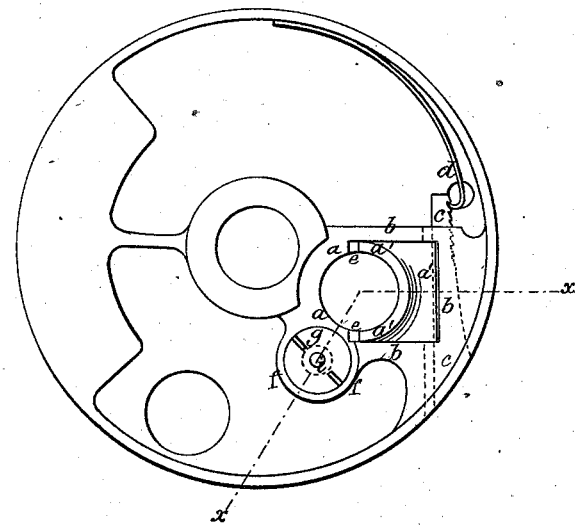
Figure 3:
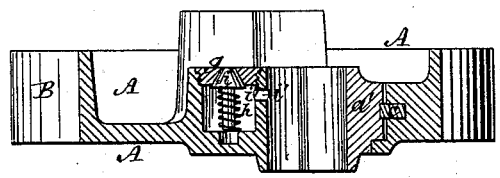

Figure 1 represents a perspective view of the balance crank or crank-wheel, with its several appliances. Fig. 2 represents a face view of the same. Fig. 3 represents a transverse section taken through the dotted line $x$ $x$ of Fig. 2.

My invention relates, first, to a wrist-pin box, one part of which is cast on and with the balance-crank, and the other part made adjustable thereto, so that the wear may be taken up by the adjustable part, and the other or permanent part serve as a gage to maintain a uniform length of pitman; and my invention further relates to an oil box or holder, cast in or on the balance-crank, and in such a relation to the center of motion of the crank, and with a communicating passage leading into the wrist-box, as that the centrifugal force under high speed will hold back the oil, and prevent it from too freely flowing into the wrist-box, while a moderate speed, or an entire cessation of motion, will allow the oil to slowly drip into said wrist-box.

To enable others to make and use my invention, I will proceed to describe the same with reference to the drawings.

When the wrist-pin is on the pitman, and the box in which it works is made in the crank-wheel, the latter will wear away at one point or part only. To compensate for this wear is one of the objects and purposes of my invention.

In the drawings, A represents a balance crank or crank-wheel, it being loaded at B, in the usual way. C is the opening through the hub of the crank to receive the shaft upon which it revolves. The wrist-pin box or bearing is shown at $a$ $a'$. The part $a$ is cast on or with the crank, and may therefore be called the permanent part of said box, while the part $a'$ is a separate piece or part, fitting into an opening bounded by the walls $b$, and held therein by means of a tapering or wedge-shaped key, $c$, inserted from the exterior of the crank A, passing through a groove made in the outer edge of the portion $a'$, and held, when driven in, by a spring hook or dog, $d$, catching into one of the series of notches in the key $c$. The wear by the wrist-pin of a pitman in a box, $a$ $a'$, will all be on the part $a'$, and hence this part must be adjustable, to take up such wear. There is a small space left between the two parts $a$ $a'$, as at $e$, which may be filled with leather, rubber, or even soft metal, so as to make a continuous surface and prevent leakage of the oil therethrough, and this material will admit of the portion $a'$ of the wrist-pin box being moved toward the stationary portion $a$, while this latter will always serve as a gage or guide to preserve a uniform length of pitman, or uniform distance between the centers of motion of the pitman. Upon the crank or crank-wheel, at a point, $f$, is cast a cup or oil-holder, which has a screw-cap, $g$, fitted into it, and inside of the cup or holder $f$ there is a conical plug, $i$, which is forced into a supply-hole in the cap $g$ by means of a spring, $h$, to keep the oil from escaping. The oil cup or holder is filled from the exterior by putting the nozzle of the oil-can against the plug and pushing it inward, and then pouring in the oil. An opening, $i'$, leads from the oil cup or holder to or into the wrist-pin box $a$ $a'$, to lubricate said wrist-pin.

The oil cup or holder is placed, as will be noted, some distance from the center of the crank, and so much so as that the centrifugal force of the crank, when in high motion, will force the oil in the holder away from the communicating passage $i'$, and limit that which will pass into the wrist-pin box. When, however, the motion is slow, or the crank at rest, then free passage of the oil through the opening can go on.

Having thus fully described my invention, what I claim is—

1. In a balance crank or crank-wheel, the combination, with the wrist-pin box, made in two parts—the one, $a$, permanent, and the other, $a'$, adjustable—of the key $c$ and holder $d$, as and for the purpose described and represented.

2. In a balance crank or crank-wheel, the oil cup or holder $f$, cast in or on the crank, in combination with its cap, plug, and opening $i'$, and the wrist-pin box, as and for the purpose described and represented.

L. MILLER.

Witnesses:
L. H. HANSCOM,
N. N. LEOHNER.